(12) United States Patent
Hüster et al.

(10) Patent No.: US 9,114,755 B2
(45) Date of Patent: Aug. 25, 2015

(54) CONTROL DEVICE AND METHOD FOR DIMMING LIGHTS FOR VEHICLES DURING TURNING MANEUVERS

(75) Inventors: Christian Hüster, Salzkotten (DE); Tobias Irmscher, Gütersloh (DE); Christian Schmidt, Paderborn (DE); Carsten Wilks, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 25 days.

(21) Appl. No.: 13/699,250

(22) PCT Filed: May 19, 2011

(86) PCT No.: PCT/EP2011/058097
§ 371 (c)(1),
(2), (4) Date: Nov. 20, 2012

(87) PCT Pub. No.: WO2012/000717
PCT Pub. Date: Jan. 5, 2012

(65) Prior Publication Data
US 2013/0073144 A1   Mar. 21, 2013

(30) Foreign Application Priority Data

May 22, 2010 (DE) .......................... 10 2010 921 320

(51) Int. Cl.
*B60Q 1/14* (2006.01)

(52) U.S. Cl.
CPC .......... *B60Q 1/143* (2013.01); *B60Q 2300/336* (2013.01); *B60Q 2300/41* (2013.01); *B60Q 2300/42* (2013.01)

(58) Field of Classification Search
CPC .......... B60Q 2300/42; B60Q 2300/41; B60Q 2300/336
USPC ........................................... 701/36; 382/104
See application file for complete search history.

(56) References Cited

U.S. PATENT DOCUMENTS

| 6,928,180 | B2 * | 8/2005 | Stam et al. | 382/104 |
| 7,613,327 | B2 * | 11/2009 | Stam et al. | 382/104 |

(Continued)

FOREIGN PATENT DOCUMENTS

| DE | 197 58 665 B4 | 12/1994 |
| DE | 196 31 151 A | 2/1997 |

(Continued)

OTHER PUBLICATIONS

International Search Report for International application No. PCT/EP2011/058097 dated Jul. 13, 2011.
German Search Report for International application No. 10 2010 021 320.9.

*Primary Examiner* — Mary Cheung
*Assistant Examiner* — Michael Berns
(74) *Attorney, Agent, or Firm* — Husch Blackwell LLP

(57) ABSTRACT

A control device for a first motor vehicle, and for dimming lights for vehicles ahead and/or oncoming vehicles during turning maneuvers includes a first interface with a recognition device for the purpose of recognizing vehicles ahead and/or oncoming vehicles, a second interface with headlights, wherein the control device selects different light distributions of the headlights and generates an adjusting signal at the second interface for adjusting the selected light distribution at the headlights to dim the headlights if a signal is present at the first interface indicating at least one vehicle ahead or oncoming. The control device has a third interface for indicating the start of the recognition of a turning maneuver of a vehicle ahead, wherein the dimmed light distribution of the headlights remains set for a predetermined distance or a predetermined time if the signal is present.

6 Claims, 2 Drawing Sheets

(56) References Cited

U.S. PATENT DOCUMENTS

| | | |
|---|---|---|
| 8,376,595 B2 * | 2/2013 | Higgins-Luthman ......... 362/466 |
| 8,538,636 B2 * | 9/2013 | Breed ............................. 701/49 |
| 2006/0018511 A1 * | 1/2006 | Stam et al. .................... 382/104 |
| 2006/0018512 A1 * | 1/2006 | Stam et al. .................... 382/104 |
| 2008/0044062 A1 * | 2/2008 | Stam et al. .................... 382/104 |
| 2008/0294315 A1 * | 11/2008 | Breed ............................ 701/49 |
| 2009/0010494 A1 * | 1/2009 | Bechtel et al. ................ 382/104 |

FOREIGN PATENT DOCUMENTS

| | | |
|---|---|---|
| DE | 10 2007 000242 A1 | 10/2007 |
| DE | 10 2007 057 316 A1 | 8/2008 |
| DE | 10 2009 034 224 A1 | 4/2010 |

\* cited by examiner

CONTROL DEVICE AND METHOD FOR DIMMING LIGHTS FOR VEHICLES DURING TURNING MANEUVERS

CROSS REFERENCE

This application claims priority to PCT Application No. PCT/EP2011/058097, filed May 19, 2012 which in turn claims priority to German Patent Application No. 10 2010021320.9 filed May 22, 2010, both of which are expressly incorporated in their entirety by reference herein.

TECHNICAL FIELD OF THE INVENTION

The invention relates to a control device for a first motor vehicle, and for dimming lights for vehicles ahead and/or oncoming vehicles during turning maneuvers.
   having a first interface for connection to a recognition system, particularly a camera system, for the purpose of recognizing vehicles ahead and/or oncoming vehicles,
   having a second interface for connection to motor vehicle headlights,
   wherein the control device is suitable and designed, as part of its controlling and/or regulating function, for selecting different light distributions of the motor vehicle headlights,
   the control device is suitable and designed for generating an adjusting signal which is present at the second interface, for the purpose of adjusting the selected light distribution,
   wherein the light distribution can be selected by the control device in such a manner that it is possible to adjust a light distribution at the motor vehicle headlights which dims for the oncoming vehicle or the vehicle ahead if a signal is present at the first interface, said signal indicating at least one vehicle ahead or oncoming vehicle.

The invention also relates to a method for dimming lights for vehicles during turning maneuvers, to be carried out by means of an arrangement of a first motor vehicle having a recognition device, a control device and motor vehicle headlights, wherein the control device selects a light distribution which dims the lights for a vehicle ahead and/or an oncoming vehicle, and generates adjusting signals corresponding to the light distribution, wherein the motor vehicle headlights are controlled by means of these adjusting signals as soon as a vehicle which is ahead and/or an oncoming vehicle is recognized.

BACKGROUND OF THE INVENTION

Such control devices and methods are known in the prior art in a variety of types and implementations. By means of these methods, it is possible to dim the glare for vehicle operators of oncoming vehicles and vehicles ahead at the right time, and to provide rapid adjustment to a high-beam setting in traffic situations where there is no danger from greater light distribution, in order to provide greater driving safety. The known control devices and methods carry out the dimming and brightening more reliably than an average vehicle operator. However, driving situations continue to occur wherein a manual action on the part of the vehicle operator is necessary.

Such a driving situation can occur when the first vehicle turns and the oncoming vehicle and/or the vehicle ahead moves out of the recognition area of the recognitions means, and the control device therefore selects a high-beam distribution for the motor vehicle headlights, although during the turning maneuver or shortly after the turn, a vehicle moves into the conical light distribution of the first vehicle and needs dimmer light. As a result of delays inherent in the system, it is not possible to automatically provide dimmer light for this vehicle in a timely manner A manual action is necessary.

Such a driving situation can also occur if a vehicle traveling ahead of the first motor vehicle turns, and as a result can no longer be detected, although it is still in the detection area of the detection means, or because it has moved out of the detection area but is still within the conical light distribution of the now-utilized high beams.

A motor vehicle can be in the detection area of the detection means, but nevertheless not be recognized as an object requiring dimmer light—for example if it is not possible to recognize rear lights or front lights because the vehicle is disposed sideways [to the first vehicle], wherein this recognition is typically necessary for the detection of the object.

SUMMARY OF THE INVENTION

The invention addresses the problem of improving a control device and a method of the type named above, such that fewer manual actions on the part of the vehicle operator of the first motor vehicle are necessary.

This problem is addressed by a control device according to the invention, according to claim 1, and by a method according to the invention, according to claim 3.

The control device according to the invention has a third interface which is suitable and designed for indicating the start of the recognition of a turning maneuver of the next vehicle ahead or of the first vehicle, wherein the dimmed light distribution of the motor vehicle headlights remains set for a predetermined distance or a predetermined time if the signal is present which indicates the start of the turning maneuver.

In addition, the control device can have a fourth interface which is suitable and designed for the purpose of indicating the speed. In this case, the control device can be suitable and designed to determine a distance traveled since the start of the turning maneuver from the indicated speed. The first, second, third, and/or the fourth interfaces can be incorporated into one interface along with one or multiple other interfaces.

The method according to the invention differs from the conventional method described above in that the dimmed light distribution selected by the control device and set at the motor vehicle headlights remains set for at least a predetermined period of time or a predetermined distance, as soon as the recognition of a turning maneuver of the first motor vehicle or of the vehicle ahead is started.

After the end of the predetermined period of time, or after the predetermined distance has been traveled, the control device maintains the dimmed light distribution as long as an oncoming vehicle and/or a vehicle ahead is recognized. As long as no incoming vehicle and/or vehicle ahead is recognized, it is possible to then dispense with the dimmed light distribution after the end of the predetermined period of time, or after the predetermined distance has been traveled.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
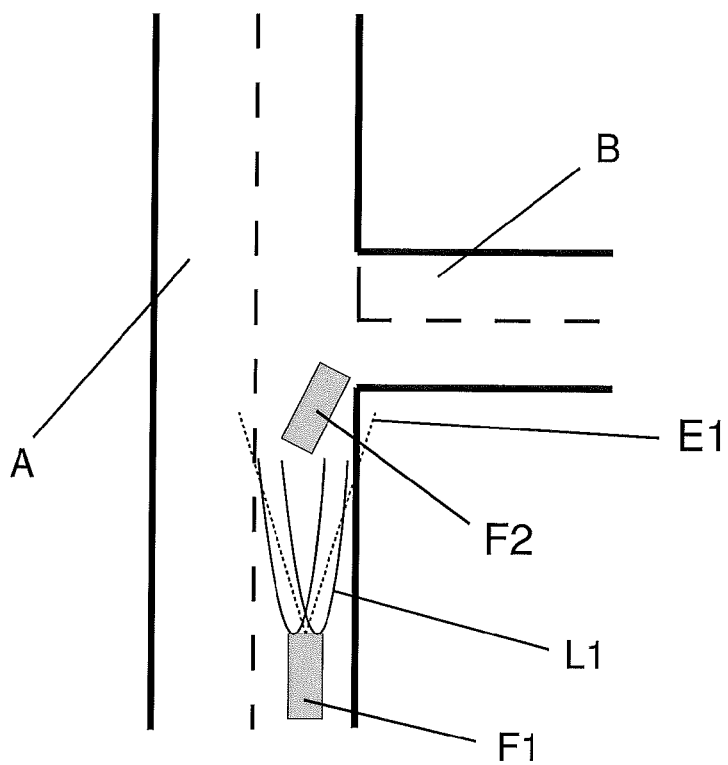
FIG. 1 shows a top view of a driving situation in which a dimmed light distribution has been selected for a first motor vehicle due to a second vehicle ahead.
Figure 2:
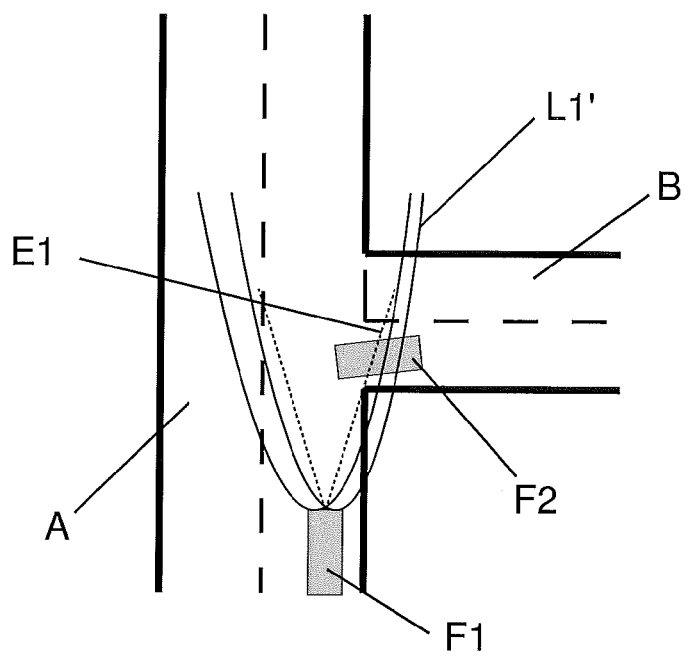
FIG. 2 shows a top view of a driving situation in which a second motor vehicle ahead, which is turning, receives excessive glare from the first motor vehicle given a configuration from the prior art.
Figure 3:
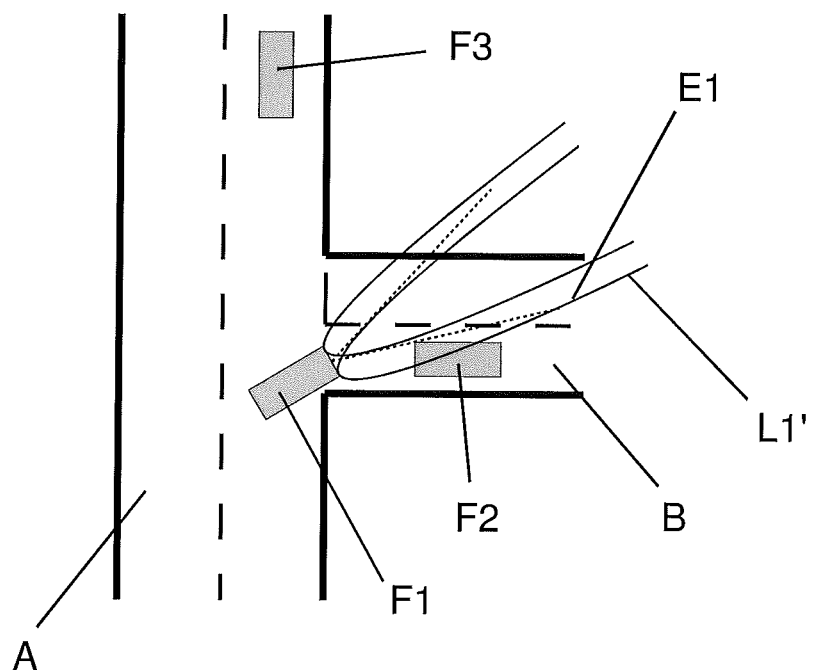
FIG. 3 shows a top view of a driving situation in which a second motor vehicle ahead receives excessive glare from the first motor vehicle, which is turning, given a configuration from the prior art.

In FIGS. 1 to 3, A indicates a street with another street B branching from street A. Motor vehicles F1, F2, F3 are traveling on the streets.

The first motor vehicle F1 has a recognition means, wherein it is possible to recognize light sources located in a detection area E1 by means of said recognition means. The light sources are classified and functionally assigned to objects. If an object requiring dimmer lights is recognized among the objects, a switch is made from a high-beam light distribution L1' to a dimmed light distribution L1 by means of a control device of the first motor vehicle. In the event that an object requiring dimming can then no longer be detected in the detection area E1, the control device switches back to the high-beam light distribution L1'.

In the driving situation illustrated in FIG. 1, the first motor vehicle F1 is following a second motor vehicle F2 on the first street. The second motor vehicle F2 is located in the detection area of the recognition means of the first motor vehicle F1. The control device of the first motor vehicle therefore has selected the dimmed light distribution L1.

The second motor vehicle F2 is in the process of turning onto street B, which branches off. As a result, it moves out of the detection area E1 of the recognition means of the first motor vehicle F1. The control device of the first motor vehicle then selects a high-beam light distribution L1' (FIG. 2). The high-beam light, however, shines beyond the detection area E1 and illuminates the second motor vehicle F2 as well, thereby providing excessive glare for the vehicle operator of the second vehicle.

At this point, in this driving situation, a remedy is provided by the control device according to the invention and/or the method according to the invention. The fact that a turning maneuver of the second motor vehicle F2 has been recognized is indicated to the control device according to the invention. Starting at the beginning of the recognition, the dimmed light distribution L1 shown in FIG. 1 is maintained for a predetermined period of time or a predetermined distance traveled by the first motor vehicle. The risk of excessive glare for the vehicle operator of the second motor vehicle is prevented in this way.

In driving situations as in FIG. 3 as well, the motor vehicle headlights of the first motor vehicle are initially set to a dimmed light distribution L1 as a result of a motor vehicle F3 ahead. As a result of the first motor vehicle turning off to the second street, the detection area E1 of the recognition means of the first motor vehicle F1 pivots. The conventional control device of the first motor vehicle F1 vehicle then selects a high-beam light distribution. However, there is a second motor vehicle F2 traveling ahead of the first motor vehicle F1 on the second street, which requires dimmed lights. However, a timely dimming is also not possible because of de-lays in the system of the first motor vehicle, such that in this driving situation as well, it is possible for the vehicle operator of the second motor vehicle F2 to briefly receive excessive glare. The risk of brief, excessive glare is further amplified in that the light distribution L1' shines laterally over the detection area E1.

At this point, in this driving situation as well, a remedy is provided by the control device according to the invention and/or the method according to the invention. The fact that a turning maneuver of the first motor vehicle F1 has been recognized is indicated to the control device according to the invention. In addition, it is possible to evaluate, by way of example, the status of the turn signal, the speed, the yaw, the steering angle, and/or the turn radius. Starting at the beginning of the recognition, the dimmed light distribution L1 shown in FIG. 1 is maintained for a predetermined period of time or a predetermined distance traveled by the first motor vehicle F1. The risk of excessive glare for the vehicle operator of the second motor vehicle F2 is prevented in this way.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE CHARACTERS

A first street
B second street
F1 first motor vehicle
F2 second motor vehicle
F3 third motor vehicle
E1 detection area of the recognition means of the first motor vehicle
L1 dimmed light distribution
L1' high-beams light distribution

The invention claimed is:

1. A control device for a first motor vehicle and for dimming headlights of said first motor vehicle for at least a second vehicle ahead of or oncoming to said first vehicle during turning maneuvers, comprising:
 a recognition device;
 a first interface with said recognition device for the purpose of recognizing at least one of vehicles ahead and oncoming vehicles,
 a second interface with said headlights, said second interface being operable to select different light distributions of said headlights and generate an adjusting signal to adjust a selected light distribution of said headlights, and wherein said second interface is operable to select a light distribution that dims said headlights for said second vehicle if a first signal is present at said first interface, said first signal indicating the presence of said second vehicle; and a third interface operable for identifying a turning maneuver of said second vehicle or of said first vehicle and generating a second signal indicating a turning maneuver of said second vehicle; and wherein a dimmed light distribution of said headlights remains set for a predetermined distance or a predetermined time if the second signal is present at said third interface.

2. A control device according to claim 1, further comprising a fourth interface operable for indicating a speed of said first vehicle, and determining, based on said speed, a distance covered from the start of the turning maneuver.

3. The control device according to claim 1, wherein said recognition device is a camera system.

4. A method for dimming headlights of a first vehicle during turning maneuvers, comprising the steps of:

providing a control device having a recognition device, a first interface operably connected with said recognition device, and a second interface operably connected with said headlights;

recognizing a second vehicle ahead of or oncoming to said first vehicle with said recognition device and said first interface;

selecting a light distribution that dims said headlights and generating an adjusting signal to adjust said headlights to said selected dimmed light distribution with said second interface if a first signal is present at said first interface, said first signal indicating the presence of said second vehicle; and wherein said selected dimmed light distribution remains set for at least a predetermined period of time or a predetermined distance when a turning maneuver by the second vehicle is detected.

5. The method of dimming headlights according to claim 4, wherein said control device maintains said dimmed light distribution as long as at least one of an oncoming vehicle and a vehicle ahead is recognized after said predetermined period of time or predetermined distance.

6. The method of dimming headlights according to claim 4, wherein said control device dispenses with said selected dimmed light distribution as long as at least one of an oncoming vehicle and a vehicle ahead is not recognized after said predetermined period of time or predetermined distance.

* * * * *